United States Patent
Borger et al.

[11] Patent Number: 5,897,950
[45] Date of Patent: Apr. 27, 1999

[54] FIBROUS ADDITIVE FOR ASPHALT PAVING COMPOSITIONS

[75] Inventors: Heinz-Werner Borger, Bobingen; Peter Knobloch, Grossaitingen, both of Germany

[73] Assignee: Hoechst Celanese Corporation, Charlotte, N.C.

[21] Appl. No.: 08/856,297

[22] Filed: May 14, 1997

Related U.S. Application Data

[63] Continuation-in-part of application No. 08/621,045, Mar. 22, 1996, abandoned.

[51] Int. Cl.⁶ .................................................. D02G 3/00
[52] U.S. Cl. ............................................ 428/359; 428/402
[58] Field of Search .................................... 478/357, 402, 478/359

[56] References Cited

U.S. PATENT DOCUMENTS

| | | | |
|---|---|---|---|
| 3,867,332 | 2/1975 | Chimura et al. | 524/315 |
| 4,092,458 | 5/1978 | Hoffman | 428/402 |
| 4,663,370 | 5/1987 | Marvel, Sr. et al. | 523/221 |
| 5,278,254 | 1/1994 | Furuta et al. | 525/397 |

FOREIGN PATENT DOCUMENTS

| | | | |
|---|---|---|---|
| 2676436 A1 | 11/1992 | France | C04B 26/26 |
| 39 30 599 A1 | 9/1989 | Germany | E01C 7/26 |

*Primary Examiner*—Newton Edwards
*Attorney, Agent, or Firm*—Gregory N. Clements; Walter M. Douglas

[57] ABSTRACT

The present invention describes a fiber material for use in mastic asphalt in roadbuilding for stabilizing the binder during transport, storage and incorporation, said fiber material being a macromolecular product including at least 95% of polyethylene terephthalate, the diameter of the individual fibers being ≧0.1 mm, the length to diameter ratio exceeding 5 on average, and the particle size distribution, measured as sieve passthrough as per the draft code of practice for the supply and testing of stabilizing materials in asphalt road construction in line with TP Min-StB Part 6.3.2, producing a proportion of at least 90% for the fractions ≦0.71 mm and at least 70% for the fractions ≦0.4 mm, and this product being manufactured by comminution from waste materials based on polyethylene terephthalate monofilaments.

4 Claims, No Drawings

FIBROUS ADDITIVE FOR ASPHALT PAVING COMPOSITIONS

This is a continuation-in-part of application Ser. No. 08/621,045 filed on Mar. 22, 1996, now abandoned.

BACKGROUND OF THE INVENTION

The use of fibrous additives in road construction asphalt is common.

For instance, French Patent 26 76 436-A1 mentions the addition of polyacrylonitrile fiber 10–50 mm in length and 25–100$\mu$ in diameter to delay cracking.

German Patent 39 30 599-A mentions the addition of reinforcing fibers, normally polyacrylonitrile.

It is known to add steel fibers combined with acrylonitrile-based fibers to reduce the formation of ruts in bituminous pavements (La Construction, Nov. 8, 1991, Belgium). The product ®Arbocel is known for use as a stabilizer for bituminous mixing partners based on fiber material. In the case of mastic asphalt, for example, the addition is preferably 0.3% by weight.

U. S. Pat. No. 4,663,370 describes the use of organic staple fibers, for example polyolefin fibers and polyester fibers. These fibers are added to the material which is applied as the new wear course in the repair of bituminous pavements. This is done to fill in and even out ruts and cracks. According to the invention, such a fiber use of 0.25–10% by weight is combined with up to 10% by weight of straight-chain, unsaturated fatty acid containing up to 30% by weight of resin as plasticizing aid, with up to 10% by weight of a customary inorganic addition, for example sand, and with a proportion of finely divided, high density polyester or polyolefin for adhesion improvement. The last component should have a particle diameter of not above 200$\mu$ and a length of not above 1.5 mm. This formulation is said to keep rut formation at elevated temperature and wash-out processes under control.

In the art of manufacturing bituminous pavements, it is known that the addition of a fiber material can inhibit the flow of the bitumen in the asphalt immediately after mixing, during transport and during incorporation. Specific fiber materials insure that the entire amount of binder required for the performance characteristics remains homogeneously dispersed. Bitumen runoff can lead to damage to the finished reinforcement, to the extent of complete destruction during use.

A further aspect is taken into account here:

The conservation of primary raw materials is of fundamental importance. If a comparable solution can be achieved by using secondary raw materials, this is preferable to the use of a primary raw material.

It may be specifically recalled that a recovered material whose starting materials are wastes based on polyester monofils ought to be found an advantageous use. Such polyester filaments are used for example in paper machines in the sheet formation region and at the dry end and also for various product filtrations, pressing operations and transport operations. Waste materials are produced in the manufacture of these filaments, in fabric making, in fabric setting, in making up and finally as product after the intended use.

Substantially clean product can flow back into man-made fiber production through remelting and additional treatment steps, for specific articles. However, this is not solution for the entire amount available on the market and for the product after its intended use. Here the only solutions on offer remain landfilling and incineration with recovery of thermal energy. On the other hand, the number of companies involved in the manufacture of such products and the number of users are limited, so that specific collection of such waste materials is possible.

Hereinafter it will be shown that these various themes can be advantageously combined in the creation of a novel product having a favorable combination of properties.

PREFERRED EMBODIMENT OF THE INVENTION

The product of this invention has a fibrous character. The underlying waste material is monofilaments of polyethylene terephthalate in monofil form, in the form of wovens, knits, spirals, spiral cloths. The raw material used comprises not only product from the various stages of manufacture but also product after its intended use. The proportion of other polymer systems is less than 5%, which also holds for any chemical modification present. The material is substantially oriented and substantially crystalline. The basic properties correspond to those of highly oriented, crystalline fiber products based on polyethylene terephthalate. Worthy of note are the high melting point of about 258° C., the generally favorable weathering and chemical resistance, the low water regain on the order of 0.1%. The material is odorless.

An essential aspect is the "fiber length distribution". It is determined here not by determining the length in mm, but by a sieving process in accordance with the draft code of practice for the supply and testing of stabilized materials in asphalt road construction in line with TP Min-StB Part 6.3.2. which is incorporated herein by reference.

Specifically, TPMin-StB Part 6.3.2 provides technical test instructions for minerals used in road construction and relates to the grain size distribution of sand. The instructions are published by the Research Society for Roads and Traffic in Germany.

In accordance with TPMin-StB Part 6.3.2, air-blasting is used to determine the grain size distribution of sand. The instruments used to perform the test include the following:

(a) a heating cabinet per DIN 50011 Sheet 1, incorporated herein by reference, for temperatures up to at least 120° C.;

(b) a scale with readability of 0.01 g;

(c) an analytic screen, or sieve, with a round screen frame of 200 mm nominal diameter and wire screen bottoms per DIN 4188 Sheet 1, incorporated herein by reference, with mesh widths of e.g., 0.032 mm, 0.04 mm, 0.063 mm, 0.09 mm, 0.25 mm and 0.71 mm, fitting on the airjet classifying machine;

(d) analytic screen with a round screen of 200 mm nominal diameter and with wire screen bottoms per DIN 4188 Sheet 1 with a mesh width of 2.0 mm;

(e) for studies in the ultrafine grain size range, etched analytic screens with round screen frames of 90 mm nominal diameter and hole widths of 0.02 and 0.01 mm;

(f) airjet classifying machine with Plexiglas screen lid, plastic hammer and pressure gauge;

(g) dust vacuum to generate a pressure difference >10 mbar; and (h) coiler plate, or rotary divider, for dividing up samples.

The grain size analysis is performed in three steps: (1) a determination of the >2 mm content; (2) analysis of the <2 mm content; and if necessary, (3) analysis of the <0.032 mm content. To determine the upper grain content >2 mm, a quantity of at least 200 g is required. For analysis of the grain classes $\leq 2$ mm, a quantity of (45±5) g is required. For the analysis of the grain classes $\leq 0.032$ mm, a quantity of (11±2) g is required.

The sample is spread out on a sheet metal plate in a uniform layer thickness, dried in the heating cabinet at (110±5)°C. for 24 hours and cooled in a drying desiccator. The required sample quantity for the determination of the grain size distribution >2 mm is obtained by dividing the sample according to Part 2.3.½ of the TPMin., herein incorporated by reference. The sample of $\leq 2$ mm grain size is divided for further analysis by using the coiler plate.

More specifically, a sample obtained for determining the upper grain content >2 mm according to Part 2.3.½ of the TPMin is divided up according to Part 6.3.2 of the TPMin with the 2 mm screen into two fractions of > and $\leq 2$ mm. The quantity >2 mm is determined to within 0.01 g, and the content $\leq 2$ mm is divided further by using the coiler plate.

At least (45±5) g is fed into the airjet classifying machine. At this time, the screens are used individually in the sequence of increasing mesh width. After the screen is covered with the plexiglass lid, the airjet classifying machine is turned on for a period of 6±1 min. The pressure in the machine must be between 10 and 25 mbar below standard air pressure during the classifying process. The residue of the test material is weighed to within 0.01 g and shaken onto the screen with the next larger mesh width. In the case of screening with mesh width of $\geq 0.09$ mm, the screening duration can be reduced to 3 min.

A sample of at least (11±2) g is used to determine the grain content $\leq 0.032$ mm. The airjet classification of this sample part takes place in the same manner as described for analyzing the $\leq 2$ mm grain fraction but using the etched screen of 70 mm diameter.

In accordance with the present invention, therefore, careful commminution is carried out to achieve a sieve pass-through rate in line with TP Min-StB Part 6.3.2, of at least 95% for particle sizes $\leq 0.71$ mm; a sieve pass-through rate of at least 90% for particle sizes in the range 0.25–0.7 mm; a sieve pass-through rate of at least 80% for particle sizes $\leq 0.4$ mm; and a sieve pass-through rate of at least 70% for particle sizes in the range 0.25–0.4.

Thus, it is not sufficient to subject the waste materials obtained to a generally well known coarse comminution. The fibrous elements are stiff owing to the diameter/length ratio within the range from 1:10 to 1:50. Owing to the monofilamentous nature of the waste materials, the commuted product is a macromolecular product, that is, a product characterized by a high molecular weight. The surface is rough and uneven due to the process of comminution. This leads to particularly easy mixing into bituminous compositions. Any clumping and intertwining of the individual elements is inhibited.

The examples which follow illustrate the manufacture of the product of this invention. Finally, they also describe its suitability for use as a stabilizer in road construction asphalt, specifically mastic asphalt.

The known comminution of monofil wastes based on polyethylene terephthalate in the form of monofil strands, warp remnants, fabric remnants, spirals, spiral cloth remnants, fabric pieces, and product after its intended use with the aid of a cutting mill is not sufficient: overlengths occur. The length distribution is extremely broad. The attempt to reduce the proportion of overlengths gives rise to an increasing proportion of dust. The reduction in the maximum linear dimension by using finer and finer sieves leads to an increase in the proportion of dust, to a pronounced reduction in the throughput, and finally to the risk of overheating and hence fusion of the material. Overlengths cannot be completely ruled out. A product as described above is not obtained.

To obtain the product of this invention, first a coarse comminution of the above-recited products is carried out with a cutting mill to average dimensions of not more than 5–10 cm in length. This intermediate product is then fed into a cutting granulator. Compared with a cutting mill, the number of rotating blades and the speed of rotation are increased. A specific sieve is used, for example with oval holes of approximate dimensions 0.4×0.6 mm. Here a comminution to the product of this invention is achieved without overheating of the material. The fine adjustment is effected by visual assessment of the material, by assessment under an eyeglass of 5- to 10- fold magnification, and by the sieve process as described above.

The below-described investigations relate to this product according to the present invention:

The runoff test with a 0/8 mm mastic asphalt, a binder content of 7.0% by mass of bitumen 80 and addition of 0.7% of the above product resulted in a laboratory measurement for the presence of unstabilized binder of 0.1% by mass. For this, 1 kg of mastic asphalt is stored in a beaker at 170° C. for 1 h and, after the beaker is turned over, the amount of sediment adhering to the walls of the beaker is determined and defined as nonstabilized binder.

The level of nonstabilized binder is on the same order of magnitude when a conventional fiber material is added.

If the binder content of bitumen 80 is varied within the range from 6.6 to 7.4% by mass, the level of nonstabilized binder remains in the range of 0.1–0.2%. The addition of the above-described product is thus uncritical in relation to the exact compliance with the recipe. As well as the ready miscibility and dispersion, due to stiffness and geometry of the individual fibrous elements and also the particle size distribution, this is a further positive property of the above-defined product.

To obtain information about the compactability of the asphalt thus produced, the compaction of Marshall specimens was recorded with a Marshall compactor as a function of the number of impacts. The curve is prepared in the known manner for up to 100 impacts. The curve at the end of the process of compaction with the use of the above product shows a smaller increase in gradient compared with the curve relating to the use of a conventional fiber. This means the final deformation is obtained more quickly here.

In addition, the compaction with 7.0% by mass binder content corresponds to the compaction curve on using a conventional fiber material with 7.4% by mass binder content. This means that the binder content of the asphalt—here the level of bitumen 80—can be reduced if the product of the present invention is used. The proportion of the relatively most costly individual component can thus be reduced. This is a further advantage of the product presented here.

An appropriate conversion shows that the void content on using the herein-presented product is within the range 2.9–3.8% and hence satisfies the requirement of ZTVbit-StB 84/90 for a void content of 24%. The level of stabilizer and of binder in the various formulations is likewise within the requirements of ZTVbit-StB 84/90. This is another indication that a comparable void content is achievable with a reduced binder content compared with a conventional fiber material. This is presumably because, owing to its chemical nature, the product presented herein does not absorb any binder by swelling.

The heat resistance is assessed on the basis of the course of the deformation curve as a function of the number of load changes and the deformation after 10,000 load changes. The specimens were Marshall specimens which were subjected to dynamic compression-swell tests at elevated temperature.

After an initially relatively strong deformation, for example at a binder content of 6.6% by mass, the increase in deformation toward the end of the run is only slight. This again makes clear that the option exists to use in total a smaller proportion of binder than in the case of the use of conventional fiber materials.

Known, however, is the high stability of polyethylene terephthalate, especially in combination with high crystallinity and high orientation. Known is the long lifetime of high polymer roof membranes based on bitumen with polyester-based nonwoven base materials. It can be deduced from this that the properties of the product presented here will not change during use in the pavement. This product is likely to have the same useful effect if the pavement is later recycled.

What is claimed is:

1. An additive for use in mastic asphalt paving compositions comprising a macromolecular fibrous product manufactured by comminuting waste materials based on polyethylene terephthalate monofilaments, wherein the comminuted fibrous product is comprised of at least 95% of polyethylene terephthalate, the individual fibers having a diameter of $\geq 0.1$ mm and a length to diameter ratio $>5$, and wherein the comminuted fibrous product has a particle size distribution, measured as sieve pass-through as per the draft code of practice for the supply and testing of stabilizing materials in asphalt road construction in line with TP Min-StB Part 6.3.2, of at least 95% for particle sizes $\leq 0.71$ mm.

2. The additive of claim 1, wherein the comminuted fibrous product has a particle size distribution of at least 90% for particle sizes in the range of 0.25–0.7 mm.

3. The additive of claim 1, wherein the comminuted fibrous product has a particle size distribution of at least 80% for particle sizes $\leq 0.04$ mm.

4. The additive of claim 1, wherein the comminuted fibrous product has a particle size distribution of at least 70% for particle sizes in the range of 0.25–0.4 mm.

* * * * *